US009727043B2

(12) United States Patent
Illner et al.

(10) Patent No.: US 9,727,043 B2
(45) Date of Patent: Aug. 8, 2017

(54) METHOD FOR STARTING UP MACHINES OR MACHINES IN A MACHINE SERIES AND PLANNING SYSTEM

(75) Inventors: Sven Illner, Auerbach (DE); Jochen Keller, Chemnitz (DE); Lutz Müller, Bernsdorf (DE); Lars Tanneberger, Amtsberg (DE)

(73) Assignee: Siemens Aktiengesellschaft, München (DE)

( * ) Notice: Subject to any disclaimer, the term of this patent is extended or adjusted under 35 U.S.C. 154(b) by 455 days.

(21) Appl. No.: 13/183,596

(22) Filed: Jul. 15, 2011

(65) Prior Publication Data
US 2012/0185844 A1 Jul. 19, 2012

(30) Foreign Application Priority Data

Jul. 16, 2010 (DE) .......................... 10 2010 027 289
Nov. 17, 2010 (EP) .................................... 10191536

(51) Int. Cl.
| | | |
|---|---|---|
| G06F 9/445 | (2006.01) | |
| G05B 19/042 | (2006.01) | |
| G05B 19/00 | (2006.01) | |
| B60H 1/00 | (2006.01) | |

(52) U.S. Cl.
CPC ........... G05B 19/0426 (2013.01); B60H 1/00 (2013.01); G05B 19/00 (2013.01)

(58) Field of Classification Search
CPC ...... G05B 19/05; G05B 19/056; G05B 15/02; G05B 19/0426; G05B 13/042; G06Q 10/06; G06F 11/36621; G06F 13/1689; G06F 17/5022; G06F 17/5045; G06F 9/5044;

(Continued)

(56) References Cited

U.S. PATENT DOCUMENTS

| | | | | | |
|---|---|---|---|---|---|
| 4,080,815 | A | * | 3/1978 | Foster ..................... | B21D 5/08 72/168 |
| 4,633,424 | A | * | 12/1986 | Norberg ................. | G01D 3/063 341/122 |
| 4,802,116 | A | * | 1/1989 | Ward et al. .................... | 703/23 |

(Continued)

FOREIGN PATENT DOCUMENTS

| | | |
|---|---|---|
| DE | 102007060990 A1 | 6/2009 |
| EP | 1422619 A2 | 5/2004 |

(Continued)

OTHER PUBLICATIONS

Allen-Bradley, "Simatic S7 to Logix5000 Application Conversion Guide", Rockwell Automation, Jun. 2008, pp. 1-164 <logix-ap008.pdf>.*

Primary Examiner — Tuan Vu
(74) Attorney, Agent, or Firm — Henry M. Feiereisen, LLC

(57) ABSTRACT

A method for starting up an automation machine in a machine series is described. With the method, a software package is automatically generated in a planning system with a step tree. The step tree included in the software package is structured in the form of a graph with edges and nodes, wherein at least some of the nodes comprise start-up data or start-up information relating to the start-up data, and wherein the edges describe permitted transitions between two respective nodes. The software package is executed on a machine or on a unit which is connected with the machine for communication. A planning system for carrying out the method is also disclosed.

12 Claims, 4 Drawing Sheets

(58) Field of Classification Search
CPC ...... G06F 17/5009; G06F 13/169; G06F 8/10; B60H 1/00985; F06F 9/5044; G01D 3/063
USPC .......... 717/109; 318/400.34; 700/84
See application file for complete search history.

(56) References Cited

U.S. PATENT DOCUMENTS

| | | | |
|---|---|---|---|
| 5,744,921 A * | 4/1998 | Makaran | 318/400.34 |
| 5,838,974 A * | 11/1998 | Ritscher et al. | 717/109 |
| 6,266,805 B1 * | 7/2001 | Nwana et al. | 717/104 |
| 6,281,650 B1 * | 8/2001 | Yutkowitz | G05B 13/042 318/561 |
| 6,880,106 B2 * | 4/2005 | Donhauser et al. | 714/35 |
| 7,275,237 B1 * | 9/2007 | Schneider | G06F 8/10 715/736 |
| 2003/0014322 A1 * | 1/2003 | Kreidler et al. | 705/26 |
| 2005/0137727 A1 * | 6/2005 | Feuerbach | G05B 19/0426 700/87 |
| 2007/0165031 A1 | 7/2007 | Beoughter | |
| 2009/0063760 A1 * | 3/2009 | Weddle | G06F 13/1694 711/104 |
| 2009/0276063 A1 | 11/2009 | Hertinger et al. | |
| 2010/0107070 A1 * | 4/2010 | Devineni et al. | 715/702 |

FOREIGN PATENT DOCUMENTS

| | | |
|---|---|---|
| EP | 1710647 A2 | 10/2006 |
| EP | 2 002 316 B1 | 12/2009 |
| EP | 2002316 B1 | 12/2009 |

\* cited by examiner

METHOD FOR STARTING UP MACHINES OR MACHINES IN A MACHINE SERIES AND PLANNING SYSTEM

CROSS-REFERENCES TO RELATED APPLICATIONS

This application claims the priority of German Patent Application, Serial No. 10 2010 027 289.2, filed Jul. 16, 2010, and of European Patent Application, Serial No. EP 10191536, filed Nov. 17, 2010, pursuant to 35 U.S.C. 119(a)-(d), the content of which is incorporated herein by reference in its entirety as if fully set forth herein.

BACKGROUND OF THE INVENTION

The present invention relates to a method for starting up, updating or configuring/parameterizing—together referred to as start-up below—machines or machines in a machine series and to a planning system operating according to the method and to a planning system which generates a software package operating according to the method.

The following discussion of related art is provided to assist the reader in understanding the advantages of the invention, and is not to be construed as an admission that this related art is prior art to this invention.

Any modular machine offered by a manufacturer of automation machines, for example a machine tool, can normally be fitted with different elements, for example different tool changers, different machine shafts and different motor spindles which have different rotational speeds, for example. All of these equipment options define a machine series.

It would be desirable and advantageous to obviate prior art shortcomings and to provide a method and a system operating according to the method, which makes it easier to start up or update machines or machines in a machine series, in particular which makes start-up or updating faster and more reliable.

SUMMARY OF THE INVENTION

In the following, the term "start-up" is to be understood as meaning series start-up and series updating as well as series restart and includes start-up or restart and updating of a plurality of machines simultaneously or consecutively. The term "machine" is sometimes also used for short and includes the wording "machines or machines in a machine series".

In a method for starting up machines, an executable software package containing the start-up data for a particular machine or for the machines in the machine series is created. The machine which is respectively intended to be started up or, in the case of a plurality of machines, each of these machines or one of these machines is suitable for executing the software package in this case. If the software package is directly executed on the machine, this is effected using a control device which is included in the machine and also controls and monitors the processes carried out by the machine during operation of the machine. Alternatively or additionally, in particular depending on the form of the control device and the local prerequisites, provision may also be made for the software package to be executed on a unit which is or can be communicatively connected to the respective machine(s), that is to say a programming device or a local or else a remote server, for example.

In this case, the software package is automatically created in a planning system, to be precise using a hierarchically structured, in particular mono-hierarchically structured, step tree in the form of a graph, in particular a rooted tree, having edges and nodes.

In the step tree, at least individual nodes comprise data and/or information for starting up a machine or a reference to such data or information. In this case, a data item is, for example, a configuration parameter, that is to say a gain factor of a control loop for example, either as an actual numerical value or as an input option for such a numerical value. As information, a node may comprise or refer to, for example, explanations, for example in the form of text. The term "data" is also sometimes used only for short below instead of the wording "data and/or information".

Furthermore, the edges in the step tree describe permitted transitions between two respective nodes. A graph is known to be an abstract data type and the step tree is an embodiment of such a data type. The step tree is created using the planning system and is filled with data or data are assigned. After such data preparation has been concluded, the planning system automatically creates the software package. The resultant software package comprises the step tree or an equivalent of the step tree.

With respect to the system, the step tree enables structured depiction of the machine on the basis of the underlying graph, in particular in the form of a tree. The step tree comprises those data and/or that information which is/are needed to start up a machine or a plurality of machines in a hierarchically structured arrangement.

Data relating to individual elements, components, control objects, etc.—together referred to as elements here and below—of a machine or machine series are stored in a product data management system (PDM system). Such a product data management system, or else any other collection of data which comprises data relating to a machine or a plurality of machines and respectively associated elements or elements which can be used with the machine(s), can be used as a database for creating the step tree.

In this case, the representation in the product data management system can be effected in a manner which is organized according to classification guidelines and is not oriented to functional interaction but rather, for example, to criteria such as storage, supplier assignment or dimensioning of a machine shaft, performance data for servomotors of the machine, speeds and expansion stages of motor spindles, capacity of tool magazines, configuration of the tool-changing devices, types of measuring transducers or else system software states, etc. Such organization can combine all or some data relating to a machine shaft, for example.

As a start-up tool, the software package is intended to make it possible to predefine or configure all parameters which are relevant to the machine. It is not very useful in this case if a start-up tool which makes all acquired data available to a parameterization process is produced using the data from the respective database and the organization provided therein. This is because the product data management system, as a database, also comprises data relating to optional elements which are possibly not present at all on the machine respectively intended to be started up. On the other hand, it is generally accepted that it is useful to manage the entire data record for a machine series in combination. Since it frequently occurs in practice that the expansion stage of a machine in a machine series also changes at short notice, it is advantageous if the data required in this case are available.

The invention and refinements of the latter thus deal with conflicting requirements, namely, on the one hand, fundamental availability of all data at any time and, on the other hand, the need for structuring of these data in such a manner that precisely those data, or only those data, to be precise only in the necessary combinatorics, which are needed to start up a respective machine are available to a parameterization process. This is achieved by the step tree. On account of its structure, the step tree makes it possible to hierarchically organize included or referenced data. In this case, the data are respectively assigned to a node in the underlying graph. A node can accordingly also be interpreted as a start-up step and the terms "node" and "start-up step" are accordingly used synonymously below. On account of well-defined transitions between individual nodes/start-up steps, namely on account of edges which each connect two nodes, it is possible to traverse, that is to say pass through or execute, the step tree. When executing the step tree, data are input according to the start-up steps carried out in the process or references to referenced data are resolved etc. and are transmitted to the machine or a plurality of machines. In this case, transmission is normally effected to the control device of the machine(s) and to memory locations which are provided there for configuration, parameterization, etc. and are read in a manner known per se during operation of the machine in order to ensure intended operation.

When creating the step tree, the structure of the latter is stipulated, on the one hand, and data are linked to the individual nodes/start-up steps in accordance with the respective position in the structure, on the other hand. Any desired number of start-up steps—also sometimes referred to only as a step for short below—on a level below a node, that is to say below another start-up step, form a group. Each step can again form a node for a new group.

If the step tree is set up for sequential execution, that is to say for successive execution of the steps included in the step tree in accordance with the structure of the step tree, each data item or each item of information can be individually interrogated for starting up the respective machine or machine series, the interrogation being carried out in a technologically useful order on the basis of the structure of the step tree.

If the execution of steps and/or the transition from one step to another is/are designed such that the execution of the step depends on the result value of a logical condition, it is possible to dynamically execute the step tree, the execution becoming dynamic by virtue of the fact that a response is given to defined conditions, for example on the basis of actual circumstances. A simple example of such dynamic execution is the check in order to determine whether the respective machine has a particular configuration, for example also a third shaft in addition to a first shaft and a second shaft. When executing the step tree, a transition which branches to a step or a group of steps comprising data for a third shaft is therefore executed only when such a third shaft is actually present in the machine. In order to check the respective configuration of the machine, it is possible to resort to a configuration data record stored in the machine, for example, or the machine configuration is determined by a self-test which is normally included in the basic functionality of the machine and in which all connected functional units report their association with the machine and usually further data, for example spindle size or the like, to a central unit of the machine.

If individual steps or groups of steps can be activated or deactivated within the step tree and only activated steps are executed, activation of particular steps and thus their fundamental executability can be predefined, for example as early as when planning the step tree which is subsequently directly or indirectly included in the software package which acts as a start-up tool. On the other hand, the executability of other steps can be prevented by corresponding deactivation as early as during planning. Deactivation of a step comes into consideration, for example, for an edge/transition which branches to the configuration of a third machine shaft if it is certain that the machine(s) for which the planned software tool is intended does/do not comprise a third machine shaft. Other steps in which unconditional activation may be useful are, for example, those steps which branch to configuration of a connection of the machine(s) to a superordinate unit. Unconditional activation/deactivation may also be useful if the operator is supposed to make a subjective decision on the machine regarding whether or not NC (numerical control) cycles or parts programs are subsequently installed. Furthermore, unconditional activation of individual steps may be useful if it is not possible to make the execution of the respective step dependent on a condition, for example because no data which can be read in the machine are available in order to formulate the condition.

If at least one step in the step tree is linked to at least one script and the script contains at least one instruction and/or data, such scripts can be automatically executed when executing the step tree. Such scripts and the at least one instruction included therein result in additional possibilities for user guidance when executing the software package generated for the purpose of starting up the machine(s).

A script may contain, for example, the drive or NC parameters for a drive or a shaft, which parameters are loaded into the control device. In this case, a script is particularly suitable if arithmetic or logical operations have to be carried out in order to determine the actual drive parameters. Such operations may be coded in a script. The operation(s) can be carried out while executing the script, and a value, for example a numerical value, which can be transmitted to the control device results. Furthermore, a script can stipulate, for example, an upper limit for a particular input value and can reject all inputs above this upper limit, with the result that parameterizations on the basis of inputs which do not satisfy particular conditions coded in a script are not possible.

If the script or one or more scripts contain(s) at least one reference to start-up data for the machine or machine series which are stored in an external system, in particular a product data management system, the data from the external system can be automatically taken over into the machine or into a unit intended to receive data relating to the configuration of the machine on the basis of the instructions in the script.

Suitable machines which can be configured using the approach presented here and possibly the refinements of the latter are automation machines, in particular machine tools.

A planning system is suitable for implementing the approach presented here and possibly the refinements of the latter, which planning system is intended to use a previously created step tree to create a software package which can be executed on a machine or one machine in a machine series, the software package comprising the start-up data for the respective machine or machine series or references to such data, for example in the form of reference points, in particular referencing of data in the PDM system. The planning system is used when planning the software package intended for actual start-up. The planning system makes it possible for a planner to combine the data and information needed for start-up in a structured manner and to allocate the resultant structure to individual steps in the step tree in an order which is useful or necessary for the data and information. The planner also uses the planning system to activate or deactivate individual steps in the step tree etc., for example. Such planning allows the software package which is intended to start up the machine(s) to be centrally created. When the software package is centrally created as a start-up tool, the possibilities for practical handling involve a software package being generated for a plurality of machines, for example, and the activation/deactivation of the steps for each machine being stored in a configuration file which is evaluated when executing a package, or a software package being generated for each machine, which software package contains activation/deactivation of the steps which is specific to each machine. In this case, the abovementioned configuration file may be part of the software package.

The software package can be created, for example, by the machine manufacturer who is in the best position to structure the data/information on account of the comprehensive knowledge of the range of functions of his own machines. The planning result is first of all the step tree and then a software package which is automatically generated on the basis of said tree and can be made available to the user of a machine in order to start up the latter. The user entrusted with start-up in situ does not require any detailed knowledge, like the machine manufacturer has, and, during execution of the software package, can be gradually guided to all data and information relevant to start-up/configuration by the execution of the step tree taking place in the process and can make corresponding inputs, changes, etc. if provided for by the planner when creating the step tree.

The approach presented here and possibly individual refinements or a plurality of refinements thereof are thus implemented both by the planning system and by the software package generated using the planning system. The planning system is used to construct the step tree by stipulating the structure of the latter and allocating start-up data and information to individual nodes, which are included in said step tree and represent start-up steps, in accordance with their position in the step tree. The software package makes it possible to execute the step tree generated in this manner in automated fashion when starting up one or more machines.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
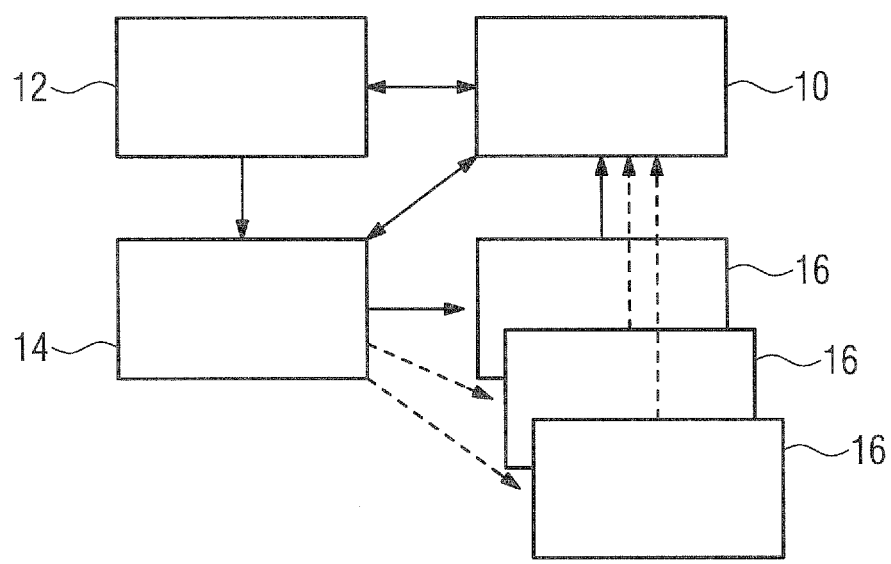
FIG. 1 shows schematically in form of a simplified diagram a product data management system, a planning system, a software package which can be generated using the planning system and a plurality of machines, for the start-up of which the software package is intended, according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown in form of a simplified diagram a product data management system 10 (PDM system), a planning system 12, a software package 14 which is or can be generated using the planning system 12 and a plurality of machines 16, the software package 14 being intended to start up a machine 16 or one machine 16 in a machine series, in particular a plurality of machines 16 in the same machine series.

The arrows running between the blocks which represent the abovementioned units illustrate a flow of data: the planning system 12 imports data from the product data management system 10 and/or references data in the product data management system 10; the planning system 12 generates the software package 14 and data flow from the planning system 12 into the software package 14 in this case; the software package 14 may reference data in the product data management system 10 or data from the product data management system 10 could be incorporated in the software package; the software package 14 is finally used to start up or configure a machine 16 or a plurality of machines 16; in this case, the product data management system 10 may be accessed, for example by storing data relating to the start-up result in the product data management system 10.

Figure 2:
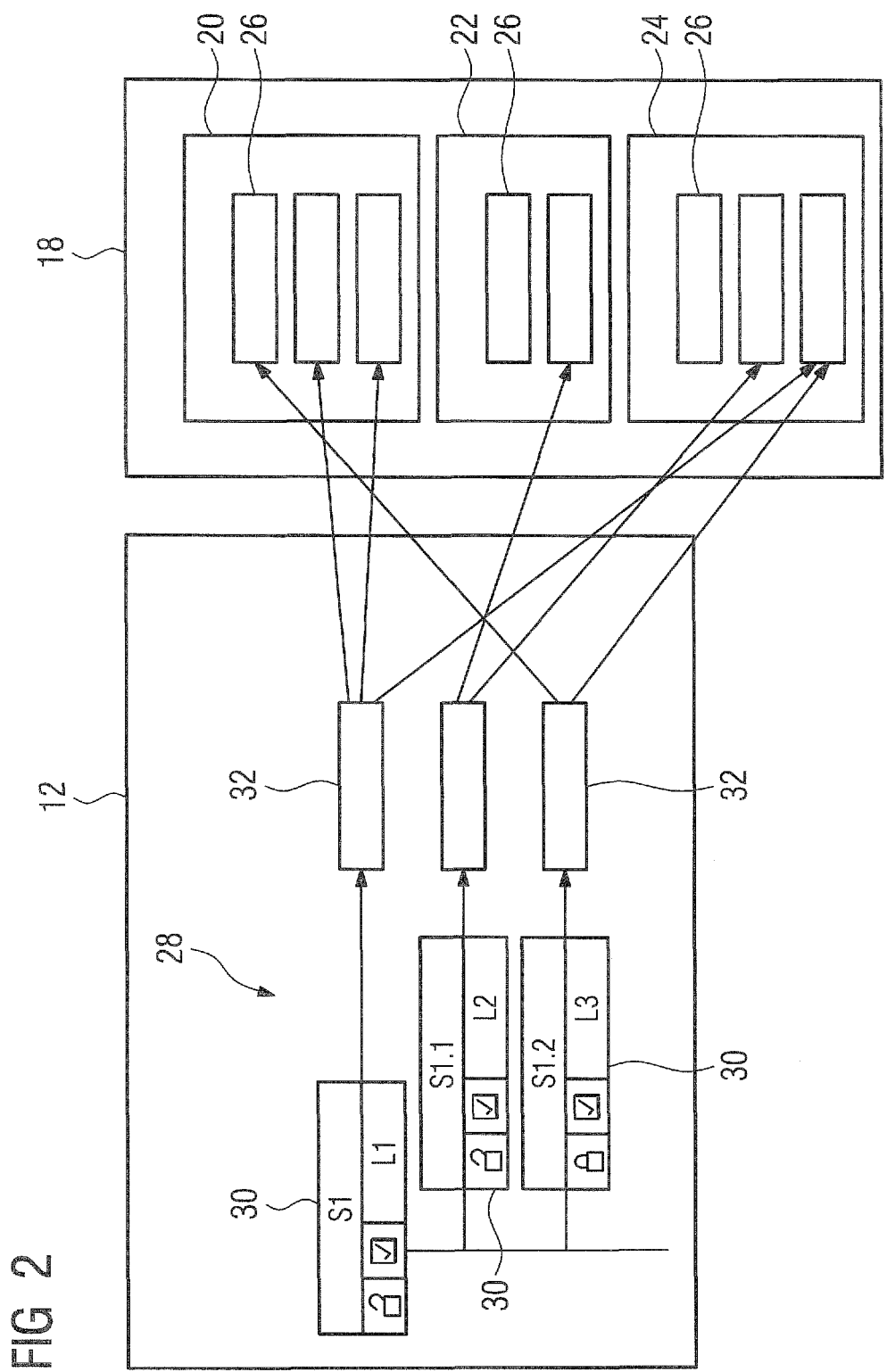
FIG. 2 shows the planning system and a data record which is provided by the product data management system and contains further details, in particular a step tree.

FIG. 2 shows that data, that is to say start-up data, relating to individual elements of a machine 16, for example a machine tool, are stored in a data record 18 provided by a product data management system 10 (FIG. 1). The data in the product data management system 10 are usually represented in this case in an organized structure, as mentioned at the outset. The data may be stored with a highly simplified representation, for example as follows:

Shaft x
NC data x
Drive data x
Sensor data x
Motor data x
Shaft y
NC data y
etc.

Alternatively, the following structure is also an option, in principle:

NC data
NC data x
NC data y
NC data z
Drive data
Drive data x
Drive data y
Drive data z
Sensor data
Sensor data x
etc.
etc.

Three data groups, that is to say a first data group 20, a second data group 22 and a third data group 24, each of which respectively comprises at least one data item 26, for example a data item as mentioned above, are illustrated by way of example for the data record 18. The first data group 20 may therefore be, for example, NC data, for example gain factors of the machine controllers. The data group 20 thus comprises at least one data item 26 representing a gain factor. The second data group 22 may be, for example, sensor data which indicate the resolutions of the machine sensors, for example. The data group 22 thus comprises at least one sensor data item as data item 26. The third data group 24 may be, for example, drive data which indicate motor types and powers of the machine motors, for example. The data group 24 thus comprises at least one data item 26 representing motor data.

The multiplicity of elements and modules with which modular machines may be provided quickly result in a vast number of possible combinations and permutations (referred to as combinatorics here), most of which are generally technically not useful however, for example a combination of motors having a high torque with a power section designed for low torques. It is therefore not trivial to indicate those combinations which are technically useful and to make them easily selectable in a structured form.

Since the expansion stage of a machine or a machine series still often changes at short notice in practice, it is advantageous if the data additionally required in this respect are available, with the result that it is useful to manage the entire data record 18 of a machine or a machine series in a package.

In this respect, FIG. 2 shows a graphical representation of a step tree 28 inside the planning system 12. The combinations of data suitable for the actual form of the machine/machine series can be easily compiled in a simple and unmistakable manner from the respective data record 18 of a machine or machine series, that is to say by accessing the product data management system 10 (FIG. 1) for example, with the aid of the step tree 28. The step tree 28 makes it possible to combine only those data or else precisely those data which are suitable in view of the form of the machine.

For this purpose, elements and other functional units of the machine(s) and of the control device acting as a machine controller, referred to as machine and control objects below, are depicted in the step tree 28 using the planning system 12. The step tree 28 is based on a graph and, as such, comprises a plurality of nodes which are connected by edges. The nodes of the step tree are referred to as steps 30 and the edges or connections between individual steps 30 are referred to as transitions. Any desired number of steps 30 on a respective level of the step tree 28 below a node form a group (see FIG. 2, FIG. 3). Each step 30 can again form a node for a new group. Each step 30 can be linked to one or more scripts 32 (FIG. 2). Such scripts 32 contain step-related data and instructions. At least one step 30 must be linked to a script 32.

The depiction of the machine 16 or machine series in the form of a step tree 28 first of all selects, from the multiplicity of fundamentally possible combinations of all data included in a data record 18, precisely one combination of these data, that is to say, for example, configurability of a drive for a third motor shaft only when the respective machine allows a third motor shaft to be used. The data are then also organized in a hierarchical manner using the step tree 28 with its tree-like structure in such a manner that the respective machine is parameterized in a useful or technically necessary order for its start-up when executing a software package 14 (FIG. 1) which is generated using the step tree 28. In this case, at least individual nodes of the step tree 28 each form a start-up step (step 30), individual other nodes possibly being able to be provided only for grouping or structuring purposes, and successive individual start-up steps 30 are carried out in a technically useful or necessary order when executing the step tree 28 in accordance with the hierarchical structure of the latter. The step tree 28 is given the structure necessary for this purpose by virtue of the included individual steps 30 or the underlying nodes being connected by edges (transitions), and a particular step 30 can be carried out, starting from another step, only if a transition is indirectly or directly provided between the two steps 30. Possible transitions are stipulated by the planner when creating the step tree 28.

FIG. 2 illustrates a plurality of such transitions, for example the transition between the step 30 with the symbolic designator "S1" and the step 30 with the symbolic designator "S1.1". The step 30 with the symbolic designator "S1.1" can consequently be carried out only if the step 30 with the symbolic designator "S1" has already been previously carried out, that is to say if the start-up step 30 with the symbolic designator "S1" has already been carried out in a specific start-up situation. The two start-up steps 30 mentioned can therefore be logically or technologically related such that, for example, the execution of the start-up step 30 with the symbolic designator "S1.1" is useful only when or precisely when the start-up step 30 with the symbolic designator "S1" has already been carried out.

FIG. 2 symbolically designates all illustrated steps 30 S1, S1.1, S1.2. A step can be activated and can therefore be allowed to be executed. This is illustrated by a marked box in FIG. 2. Such activation or possibly also deactivation is normally stipulated during planning and can possibly still be changed during execution of the software package 14 (FIG. 1) generated in the process, that is to say during start-up, if such a change is permitted, that is to say if the software package 14 is intended to be adapted to the respective form of the machine by the operator while the software package is being executed on the machine, for example. A sequence of start-up steps 30 which is predefined per se by the structure of the step tree 28 can be influenced in this manner.

FIG. 2 symbolizes the possibility of changing the activation/deactivation with a lock, the open lock shown indicating a possibility for changing the activation or deactivation stipulated during planning.

An additional or alternative possibility for influencing the execution of individual steps or a plurality of steps involves the execution or executability of a step 30 depending on the result value of a logical condition. Such logical conditions are schematically illustrated in a simplified form as further properties and are each symbolically denoted L1, L2, L3 in the illustration in FIG. 2. Variables, machine data, hardware configurations which can be read, software versions which can be read, system variables which can be read etc. can be used and linked in a suitable manner when formulating the respective logical condition.

The step tree 28 is executed in an order stipulated by the transitions between start-up steps, that is to say sequentially, during execution, that is to say during execution of the software package 14 (FIG. 1) based on the step tree 28. As a result of conditional execution of individual steps 30 and their scripts 32, either by activation/deactivation or on the basis of the evaluation of a logical condition, only all data which are needed for the respective functional form of the machine 16 are transmitted to the machine 16 when starting up the respective machine 16.

Conditional selection of necessary steps 30 is controlled using properties. All steps 30 have a plurality of identical properties. A suitable property is the fact that the steps in a group can be activated or deactivated either by a simple selection (m of n—check-box) or an alternative selection (1 of n—radio button). The activation or deactivation of each individual step 28 is dependent on the permissible configuration possibilities inside the machine/machine series and can be carried out either as early as at the planning time or subsequently directly on the machine by the operator or by reading a file which comprises, inter alia, the status of this property for individual steps or all steps. In order to deliberately prevent or avoid incorrect or mistaken activation or deactivation operations by the operator on the machine, a barrier can be used during planning to prevent the operator being able to change the activation state, If a superordinate step 30 has been deactivated and is consequently not executed, all steps 30 hierarchically below said step are not executed either, irrespective of whether they have been activated or deactivated.

Figure 3:
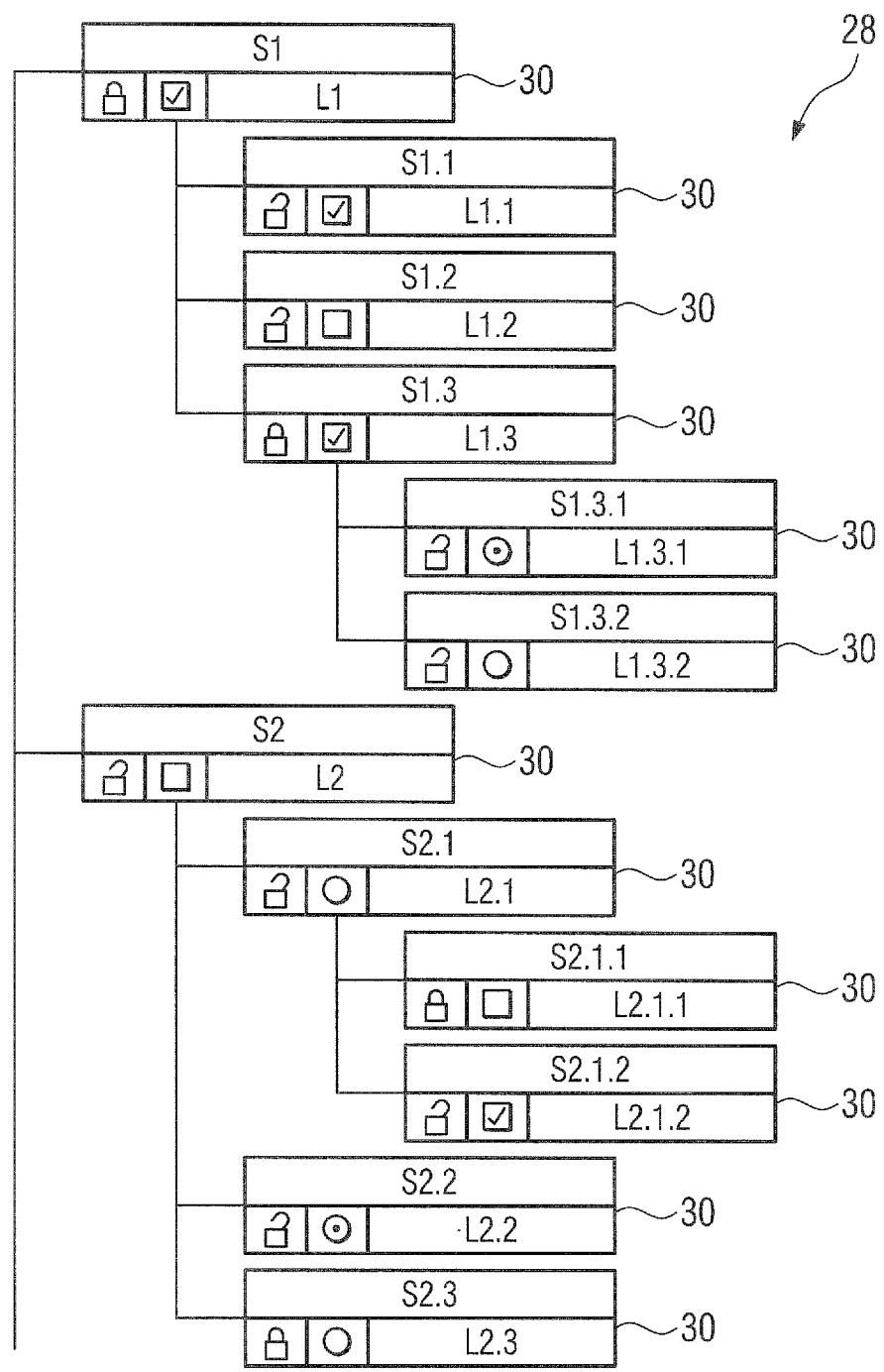
FIG. 3 shows a functional illustration of a step tree.

In this respect, FIG. 3 shows a step tree 28 which is more comprehensive than the illustration in FIG. 2 and has some elements which have already been explained in connection with the description of FIG. 2. The meaning of the symbols used in the illustration is as follows:

(open lock)=step activation can be changed by operator on the machine
(closed lock)=step activation can be changed by operator on the machine
(marked selection field; stored in color)=step has been activated and can be executed
(marked selection field; not stored in color)=step has been activated and is not executed
(unmarked selection field)=step has not been activated and is not executed.

If, in the case of a step 30, all hierarchically superordinate steps 30 have been activated and the step 30 itself has been activated and the optional logical condition requires or allows the steps to be executed, all prerequisites for executing the step 30 have been met. When executing the step 30, one or more scripts 32 which are linked to the step 30 are sequentially executed in a planned order. However, a step 30 need not necessarily have linked scripts 32 but rather can also be used only for grouping and for controlled branching in the step tree 28. The steps 30 depict, together with possible substeps, an object, that is to say a module or a functional group for example, of a modular machine 16. In this respect, the depicted object and the respectively associated steps 30 correspond.

The scripts 32 are used to provide all data, that is to say all start-up data, which have been allocated to the respective step 30 in terms of content. The scripts 32 therefore provide the prerequisite that these data can be loaded into the controller of the machine 16. Data records with different characters and instructions for handling them can be planned in the scripts 32 (files which are used to perform installation, parts programs which are needed to produce parts of the machine, modules and files which result in a modular logic program, data records for numerical machine shafts, data records for drives of the machine, alarm and diagnostic texts, images for operator assistance, definition files with user data etc.).

The scripts 32 may refer to files and data records which are stored in the product data management system 10 under other organizational criteria and sometimes also with a version number, as illustrated in FIG. 2 by the arrows to individual data items 26. This makes it possible to resolve the references after planning has been concluded at a defined time and to embed all current data, that is to say all current start-up data, and instructions, including the step tree 28, in a software package 14 (FIG. 1) which can be executed on a machine 16 to be activated. For this purpose, the software package 14 is supplemented with program code instructions which allow the step tree 28 to be executed, that is to say program code instructions which can be used to detect the structure of the step tree 28 and interpret the properties assigned to individual steps 30.

Overall, it is thus possible to execute, in particular interpretatively execute, the step tree 28 according to its structure and to execute individual steps according to the respective properties. In this case, "interpretatively" means that part of the step tree 28 is respectively read and, like in the case of a programming language, the corresponding part is interpreted, that is to say translated, and, in accordance with the translation, a next step 30 in the step tree 28 is called or a condition for executing a step 30 is evaluated, for example.

If the software package 14 does not itself contain such program code instructions, provision may be made for the machine 16 to already have a functionality with corresponding program code instructions which allow a step tree 28 contained in the software package 14 to be interpreted and accordingly executed. If the program code instructions for interpreting the step tree 28 are directly embedded in the software package 14, they are matched to the respective target system, that is to say such that a processor of a controller included in the machine can execute the program code instructions, for example.

The executable software package 14 thus contains the step tree 28, optionally in a form which is particularly suitable for interpretation purposes, possibly an executable program which, in particular, interpretatively executes the step tree 28, and the start-up data for a particular machine 16 or machine series. Furthermore, the software package 14 comprises information relating to the state of the steps 30, for example whether a step 30 has been activated or deactivated, etc. This information can be included in the software package 14 as a separate file or as a separate data record. The information may also already be directly contained in the step tree 28 or its equivalent in the software package 14 by virtue of each step 30 being represented by an independent software object with individual attributes, the attributes of the respective software object describing the properties defined for the respective step, that is to say whether the step has been activated, for example.

As early as during planning, provision may be made for the step tree 28 to not only be executed in automated fashion, for example on the controller of the respective machine 16 or machine series, but rather for the activation or deactivation of steps to also be manually performed or changed by a qualified operator on the machine 16 before the time at which the step tree 28 is executed. Such change information can also be stored in a file which is included, in particular, in the software package 14 and is selected and read before the step tree 28 is interpreted and executed.

If the machine range is expanded or changed, a step tree 28 which has been created once can be adapted in a comparatively rapid and simple manner by adding or omitting steps 30, by changing step properties or the referencing of other data.

Figure 4:
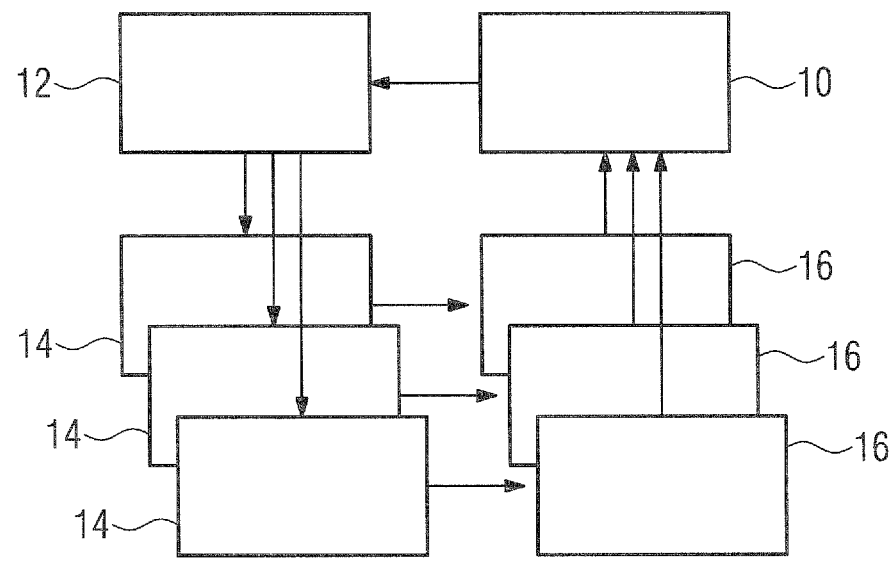
FIG. 4 shows an alternative embodiment to the illustration in FIG. 1.

In the exemplary embodiment in FIG. 1, the executable software package 14 created using the planning system 12 is executed on a machine or one or more machines in a machine series. In the exemplary embodiment in FIG. 4, special features of individual machines 16 are possibly already taken into account during planning and a software package 14 specifically intended for each machine 16 is generated for that machine. The specific work steps involved in executing the software package 14 can be documented in a logbook by a respective computer (for example the control device of the machine 16).

If, when starting up a plurality of machines 16, knowledge is gathered to the effect that correction of the start-up data proves to be advantageous or necessary, the start-up data can be directly changed in the software package 14 using the planning system 12 or else, especially if the software package 14 references data in the product data management system 10, can be changed in the product data management system 10.

The approach described here ensures that individual data items 26, data groups 20-24, data records 18 or files have to be stored only once even though they may be referenced by a plurality of steps 30 or scripts 32 included in the latter. In this case, storage can be effected in any desired structure which is oriented to organizational criteria and need not have any equivalent in an arrangement, for example according to the configuration of the machine or the structure of the step tree 28.

Figure 5:
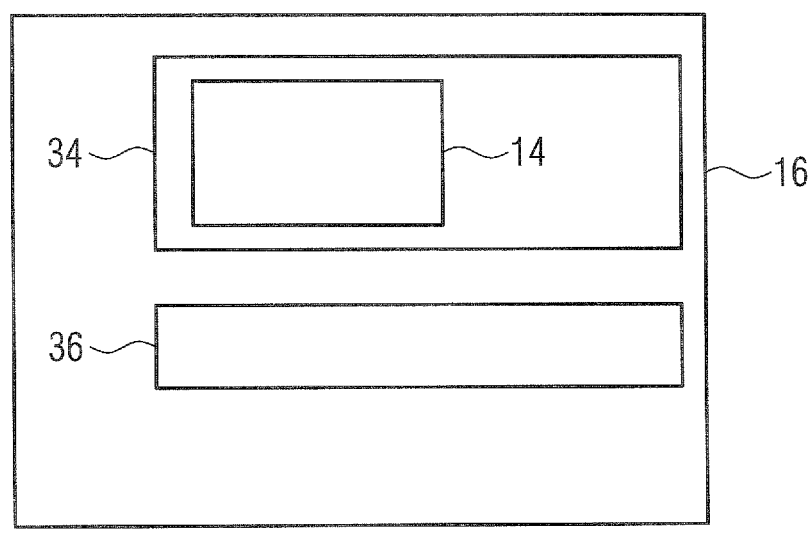
FIG. 5 shows a machine having a loaded software package and means for executing the latter.

FIG. 5 finally schematically shows, in a highly simplified form, a machine 16 having a software package 14, which has been loaded into a memory 34 of the machine 16, as the result of the planning described above. The software package 14 is executed in a manner known per se on the machine 16 by a processing unit which is included in the latter, for example in the form of a microprocessor 36. Further details of the machine 16, which is a machine tool for example, that is to say drives and the like for instance, are not illustrated and are dependent on the respective machine 16 and its configuration.

Individual aspects of the statements just made can be briefly summarized as follows: a method for starting up automation machines 16 or a machine series is specified, a software package 14 which can be executed on the machines 16 and contains the start-up data for a particular machine 16 or the machine series being created in a planning system 12 using a step tree 28 having steps 30.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method for commissioning a modular machine tool, comprising a controller having at least one processor having stored thereon executable instructions, which when executed by the processor, cause the processor to perform the steps of:

generating an executable software package of a specific machine tool with a planning system, the software package including a step tree structured in the form of a graph with edges and nodes, wherein an individual node represents an executable activatable or deactivatable commissioning step, wherein the step tree represents a structured representation of the specific machine tool with configuration data for commissioning the specific machine tool and concerning a specific implementation of the machine tool, wherein at least individual nodes comprise the commissioning data including numerical control data, drive data, and sensor data or commissioning information relating to the commissioning data including numerical control data, drive data, and sensor data and thus represent commissioning steps for commissioning the machine tool, wherein the numerical control data are data indicating gain factors for machine controllers, the drive data are data indicating motor types and powers of machine motors, and the sensor data are data indicating resolutions of machine sensors, wherein the edges describe permitted transitions between two respective nodes and commissioning steps represented by the two respective nodes, wherein the generated executable software package includes the step tree, wherein an external system is a product data management system, said data product management system being used as a database for creating the step tree, and further executing the software package by a controller of the specific machine tool or by a unit which is connected with the machine tool for communication, and executing the commissioning steps in a sequential order defined by the step tree.

2. The method of claim 1, wherein only activated steps are executed.

3. The method of claim 2, wherein at least one commissioning step is linked to at least one script containing at least one instruction or data.

4. The method of claim 3, wherein the at least one script comprises at least one reference linked to commissioning data for the machine tool which are stored in the external system.

5. The method of claim 2, wherein executing a commissioning step depends on a result value of a logical condition.

6. The method of claim 5, wherein the logical condition is associated with an edge leading to a respective node.

7. A computer program having program code instructions stored on a non-transitory computer-readable medium, wherein the program code instructions when executed on a computer, cause the computer to:

generate an executable software package of a specific modular machine tool with a planning system, the software package including a step tree structured in the form of a graph with edges and nodes, wherein an individual node represents an executable activatable or deactivatable commissioning step, wherein the step tree represents a structured representation of the specific machine tool with configuration data for commissioning the specific machine tool and concerning a specific implementation of the specific machine tool, wherein at least individual nodes comprise the commissioning data including numerical control data, drive data, and sensor data or commissioning information relating to the commissioning data including numerical control data, drive data, and sensor data and thus represent commissioning steps for commissioning the machine tool, wherein the numerical control data are data indicating gain factors for machine controllers, the drive data are data indicating motor types and powers of machine motors, and the sensor data are data indicating resolutions of machine sensors, wherein the edges describe permitted transitions between two respective nodes and commissioning steps represented by the two respective nodes, wherein the generated executable software package includes the step tree, wherein an external system is a product data management system, said data product management system being used as a database for creating the step tree, and further execute the software package by a controller of the specific machine tool or by a unit which is connected with the machine tool for communication, and execute the commissioning steps in a sequential order defined by the step tree.

8. The computer program of claim 7, wherein the numerical control data are data indicating gain factors for machine controllers, the drive data are data indicating motor types and powers of machine motors, and the sensor data are data indicating resolutions of machine sensors.

9. A non-transitory computer-readable storage medium having a computer program with program code instructions which, when executed on a computer, cause the computer to:

generate an executable software package of a specific modular machine tool with a planning system, the software package including a step tree structured in the form of a graph with edges and nodes, wherein an individual node represents an executable activatable or deactivatable commissioning step, wherein the step tree represents a structured representation of the specific machine tool with data for commissioning the specific machine tool and concerning a specific implementation of the specific machine tool, wherein at least individual nodes comprise the commissioning data including numerical control data, drive data, and sensor data or commissioning information relating to the commissioning data including numerical control data, drive data, and sensor data and thus represent start-up commissioning steps for commissioning the machine tool, wherein the edges describe permitted transitions between two respective nodes and start-up steps represented by the two respective nodes, wherein the numerical control data are data indicating gain factors for machine controllers, the drive data are data indicating motor types and powers of machine motors, and the sensor data are data indicating resolutions of machine sensors, wherein the generated executable software package includes the step tree, wherein an external system is a product data management system, said data product management system being used as a database for creating the step tree, and further execute the software package by a controller of the specific machine tool or by a unit which is connected with the machine tool for communication, and execute the start-up steps in a sequential order defined by the step tree.

10. The non-transitory computer-readable storage medium of claim 9, wherein the numerical control data are data indicating gain factors for machine controllers, the drive data are data indicating motor types and powers of machine motors, and the sensor data are data indicating resolutions of machine sensors.

11. A modular machine tool having a computer program with having program code instructions stored on a non-transitory computer-readable medium, wherein the program code instructions when executed on a computer, cause the computer to:

generate an executable software package of a specific modular machine tool with a planning system, the software package including a step tree structured In the form of a graph with edges and nodes, wherein an individual node represents an executable activatable or deactivatable commissioning step, wherein the step tree represents a structured representation of the specific machine tool with data for commissioning the specific machine tool and concerning a specific implementation of the specific machine tool, wherein at least individual nodes comprise commissioning data including numerical control data, drive data, and sensor data or commissioning information relating to the commissioning data including numerical control data, drive data, and sensor data and thus represent commissioning steps for commissioning the machine tool, wherein the numerical control data are data indicating gain factors for machine controllers, the drive data are data indicating motor types and powers of machine motors, and the sensor data are data indicating resolutions of machine sensors, wherein the edges describe permitted transitions between two respective nodes and start-up steps represented by the two respective nodes, wherein the generated executable software package includes the step tree, and further execute the software package by a controller of the specific machine tool or by a unit which is connected with the machine tool for communication, wherein an external system is a product data management system, said data product management system being used as a database for creating the step tree, and execute the commissioning steps in a sequential order defined by the step tree.

12. The machine of claim 11, wherein the numerical control data are data indicating gain factors for machine controllers, the drive data are data indicating motor types and powers of machine motors, and the sensor data are data indicating resolutions of machine sensors.

* * * * *